Dec. 15, 1964  J. KNOWLES ETAL  3,161,015
ENGINE AND HYDROKINETIC POWER TRANSMISSION ASSEMBLY
Filed June 27, 1963
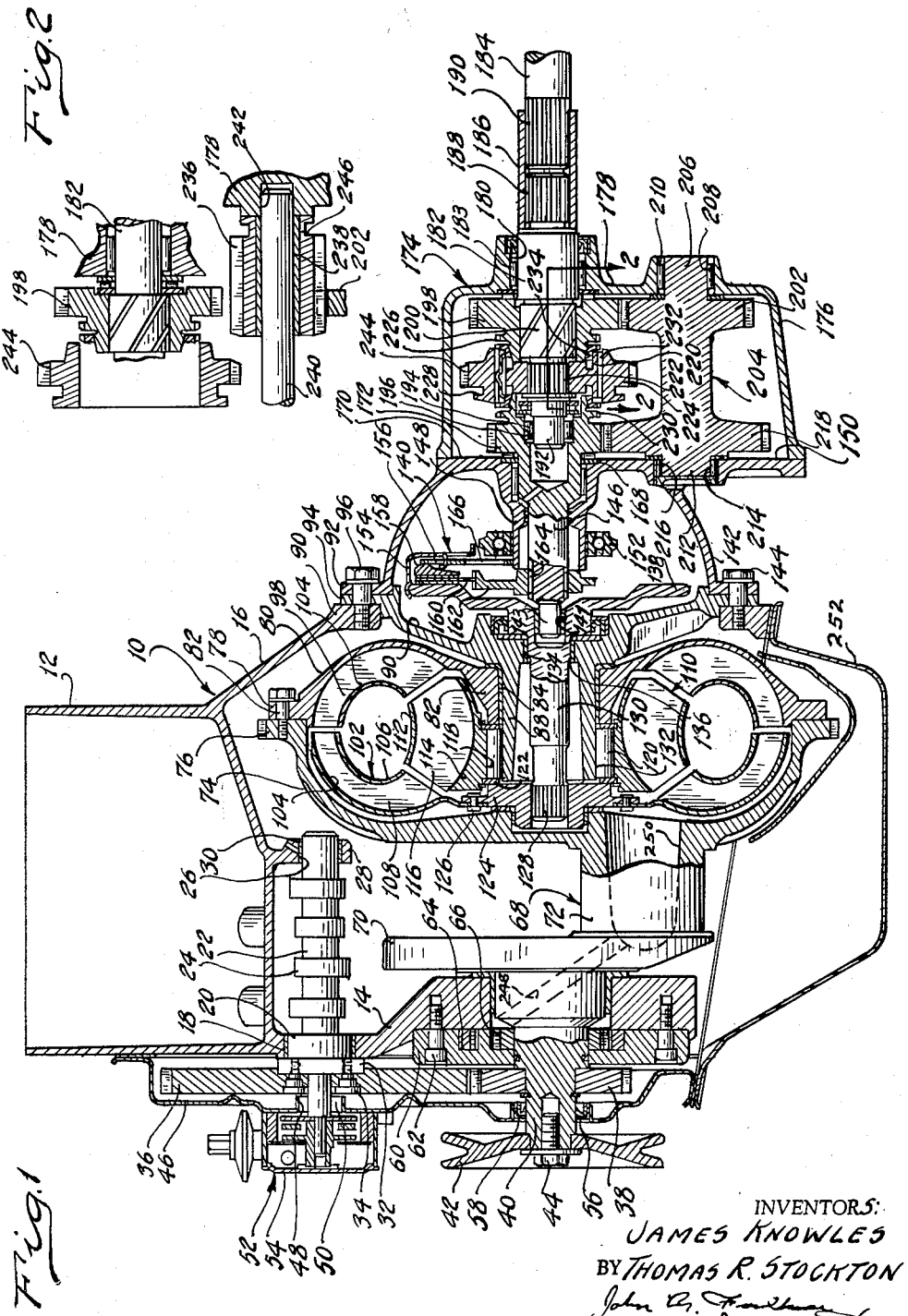
INVENTORS:
JAMES KNOWLES
BY THOMAS R. STOCKTON
ATTORNEYS.

3,161,015
ENGINE AND HYDROKINETIC POWER TRANSMISSION ASSEMBLY
James Knowles, Bloomfield Hills, and Thomas R. Stockton, Northville, Mich., assignors to Ford Motor Company, Dearborn, Mich., a corporation of Delaware
Filed June 27, 1963, Ser. No. 291,002
6 Claims. (Cl. 60—12)

Our invention relates generally to improvements in power plant systems adapted especially to be used in automotive vehicle drivelines, and more particularly to a combined internal combustion engine and hydrokinetic power transmission mechanism having components that are arranged strategically to reduce to a minimum the over-all transverse and axial dimensions for any given torque transmitting capacity.

In a conventional internal combustion vehicle engine and power transmission arrangement the hydrokinetic power transmitting unit would be mounted externally upon the engine and drivably connected to the vehicle engine crankshaft. The over-all axial length of an assembly of this type then would be equal to the sum of the separate axial lengths of the power transmission mechanism and the vehicle engine. Such an assembly is incapable of being used in a driveline for a small vehicle having a minimum space available within the vehicle chassis and the body structure.

It is an object of our invention, therefore, to provide a power transmission mechanism and engine combination that will satisfy the minimum space requirements of such an installation without sacrificing torque transmitting capacity or operating performance characteristics.

In a preferred form of our invention, we have provided an internal combustion vehicle engine and transmission system wherein the hydrokinetic portions of the transmission mechanism are situated within a housing that is common to the internal combustion engine itself. The engine and hydrokinetic portions cooperate to produce a power transmitting path to a driven member that in turn can be connected drivably to the vehicle traction wheels through suitable geared elements and a torque delivery drive shaft.

The provision of such a system being another object of our invention, it is a further object of our invention to provide a power train system that includes an internal combustion engine having a piston driven crankshaft and a hydrokinetic torque converter unit wherein portions of the crankshaft are common to portions of the hydrokinetic torque converter unit.

It is a further object of our invention to provide a system of the type set forth in the preceding object wherein the internal combustion engine components and the hydrokinetic torque converter unit are situated within a common power plant housing.

It is a further object of our invention to provide a system of the type above set forth wherein the torus circuit of the hydrokinetic torque converter unit is in fluid communication with the engine lubricating system so that a common pressure feed pump can be utilized for supplying the lubricating system as well as the torus cavity of the torque converter unit.

It is a further object of our invention to provide a system of the type above set forth wherein the crankshaft is journaled within the power plant housing at spaced locations and wherein the bearing structure for the crankshaft provides also a bearing support for the rotatable impeller housing of the torque converter unit.

Further features and objects of our invention will become apparent from the following description and from the accompanying drawings wherein:

FIGURE 1 shows in cross-sectional form an assembly view of our improved system, and FIGURE 2 is a transverse cross-sectional view taken along the plane of section line 2—2 of FIGURE 1.

Referring first to FIGURE 1, the power plant housing is identified generally by reference character 10. It includes an upper portion 12 adapted to house a suitable overhead valve arrangement that is used for controlling the supply and exhaust of a fuel and air mixture for internal combustion engine cylinders of the power plant. The housing 10 includes also a forward wall 14 and a rear wall 16. Formed within the wall 14 is a cam shaft opening 18 which receives a cam shaft bearing 20. This bearing rotatably supports one end of a cam shaft 22 having individual cam elements 24 for controlling the operation of the overhead valve arrangement.

The opposite end of the cam shaft 22 is rotatably supported within a bearing opening 26 formed in a bearing support wall 28. This wall forms a portion of the housing 10. A suitable bushing 30 is situated within the bearing opening 26.

The cam shaft 22 extends outwardly of the housing 10 through the wall 14. It is formed with a flange 32 which is bolted by means of bolts 34 to a cam shaft drive gear 36. This gear meshes with another cam shaft drive gear 38 which is keyed to one end 40 of the crankshaft. Keyed also to the end 40 is a cooling fan drive pulley 42. It is held axially fast upon end 40 by a clamping bolt 44.

A cam shaft gear cover plate 46 is secured to the outside of the wall 14 by suitable bolts, not shown. Cover plate 46 is provided with a sealed opening 48 to receive the extended end of the cam shaft 22. A suitable fluid seal 50 is situated within the opening 48 in surrounding relationship with respect to the cam shaft 22.

An ignition distributor mechanism is generally identified by reference character 52. It includes a rotor portion that is drivably connected to the end of the cam shaft to control ignition timing for the internal combustion portions of the system. Distributor mechanism 52 includes a suitable housing 54 that may be secured in a suitable fashion to the cover plate 46.

Plate 46 includes also a seal opening 56 which receives the end of the crankshaft. A seal 58 is received within the opening 56.

A pump cover 60 is bolted by means of bolts 62 to the exterior of the housing wall 14 within a cavity situated between the wall 14 and the cam shaft drive gears 38 and 36. It defines an engine pump chamber 64 within which are situated positive displacement fluid pump elements 66. The rotor portion of the pump elements 66 can be keyed or otherwise drivably connected to the end 40 of the crankshaft.

The crankshaft is identified generally by reference character 68. It includes a counterweight portion 70 and a crank portion 72, the latter being adapted to be connected to a piston rod bearing, not shown. This bearing would surround the crank portion 72 and would be received within a semi-circular portion of the piston rod. The end portion, of course, would be connected to a semi-circular bearing cap in the usual fashion.

The other end of the piston rod would be connected to a piston, not shown, by means of a suitable wrist pin in a conventional fashion. The piston in turn would reciprocate within a cylinder formed as an integral part of the engine housing 10.

We contemplate that two pistons may be employed and the piston rods for each piston would be connected drivably to the crank portion 72 of the crankshaft 68.

The crank portion 72 of the crankshaft 68 is connected integrally to an impeller shell part 74 at a location that is radially spaced from the principal axis of said crankshaft 68. Thus shell part 74, like counterweight portion 70, serves to balance the crankshaft dynamically. This part is formed with toroidal shape in a conventional fashion so that it will conform to the toroidal shape of the turbine structure which will be described subsequently.

The periphery of the shell part 74 is flanged at 76 to facilitate a connection with a flange 78 formed on a second shell part 80. Suitable bolts 82 can be provided to establish such a connection.

Shell part 80 also is formed with a toroidal shape and includes a hub 82 which is journaled by means of a bushing 84 upon a cylindrical boss extension 88. This boss is connected integrally to an end plate 90 for the power plant system. Plate 90 is bolted at its periphery 92 to the inner periphery of wall 16. This inner periphery is identified by reference character 94. Suitable bolts 96 can be provided to establish this connection.

The plate 90 forms a portion of the housing for the power plant system.

Impeller blades are shown at 98. These may be formed as a part of a unitary casting which comprises also the shell part 80.

An inner shroud 100 can be connected to the inner peripheries of the blades 98. It cooperates with the blades to define radial outflow passages.

A turbine is generally identified by reference character 102. It includes an outer shroud 104 and an inner shroud 106. Disposed within the shrouds of the turbine are turbine blades 108 which cooperate with the shrouds to define radial inflow passages. The entrance region of the turbine passages is situated directly adjacent the flow exit region of the impeller blades.

Located between the flow exit region of the turbines and the flow entrance region of the impeller is a stator 110 which includes a first shroud 112 and a second shroud 114. Disposed between the shrouds of the stator are stator blades 116 which re-direct the fluid flow that leaves the exit region of the turbine before it enters the entrance region of the impeller. It changes the tangential component of the absolute fluid flow velocity vector to make an augmentation of the turbine torque possible.

The shroud 114 of the stator forms a hub having a central opening 118. This opening defines cam surfaces which cooperate with overrunning brake rollers 120. A thrust washer 122 is situated on one side of the rollers 118 directly adjacent a turbine hub 124. The hub 124 in turn is riveted at 126 to the hub of the shroud 104. It is internally splined at 128 to a turbine shaft 130 which extends concentrically through the torque converter unit.

The overrunning brake for the stator includes also an inner race 132 which is defined by the extension 88. Rollers 120 will inhibit backward rotation of the stator but will accommodate free-wheeling motion of the stator in the direction of rotation of the impeller.

Wall 90 is formed with a bearing opening 134 which receives a bushing 136. This bushing supports one end of the turbine shaft 130. Connected to the outward end of shaft 130 is a clutch drive member 138. This member forms a portion of a selectively engageable friction clutch generally identified by reference character 140. Clutch 140 is situated within a clutch housing 142 which may be bolted by bolts 144 to the outer side of the wall 90.

Clutch member 138 includes a pilot bearing recess 141 which receives a bearing that journals a reduced diameter portion 143 of a power output member 146. This member, in turn, extends through a stationary sleeve shaft 148 that in turn is formed integrally with an end wall 150 of the clutch housing 142.

The sleeve 148 supports a clutch throw-out bearing member 152. This member can be urged in a left-hand direction as viewed in FIGURE 1 by the vehicle operator through the medium of a suitable clutch operating linkage, not shown.

Carried by the clutch member 138 is a clutch reaction element 154. This element supports a clutch actuating lever 156 which may be pivoted thereto. The radially outward end of lever 156 engages a clutch pressure plate 158 which is adapted to engage frictionally a clutch friction disc 160. The adjacent surface of the clutch member 138 forms also a friction surface. As pressure plate 158 engages disc 160, a driving connection is established between member 138 and the clutch disc.

Clutch disc 160 is internally splined to an externally splined clutch member 162. This member in turn is splined at 164 to the driven member 146.

Pressure plate 158 can be urged normally into engagement with the disc 160 through the medium of a series of clutch actuator springs, not shown. These springs are located within the annular cavity defined by the reaction element 154.

The clutch throw-out bearing 152 is adapted to engage the inner peripheries of the clutch operating levers 156. These peripheries are shown at 166. The operator thus can release the clutch at any time by manipulating the clutch operating linkage mentioned previously.

Power output shaft 146 is journaled by means of a bearing 168 within a suitable bearing opening 170 formed in the end wall 150 of the clutch housing 142. It is connected integrally to a power input gear 172 of a simplified two-speed transmission assembly identified generally by reference character 174. Assembly 174 includes a transmission housing 176 that may be bolted or otherwise secured to the right-hand end of the clutch housing 142. An end housing wall 178 has an opening 180 through which a transmission output shaft 182 extends. A suitable bearing 183 is disposed within the opening 180 to support the shaft 182.

Shaft 182 may be connected to a drive shaft 184 by means of a spline coupling that includes an internally splined sleeve 186 received over externally splined ends 188 and 190 of the shafts 182 and 184, respectively.

The left-hand end of shaft 182 is formed with a reduced diameter as indicated at 192. This end is journaled by means of bearing 194 within a pilot opening 196 formed in the gear 172.

A power output gear 198 is rotatably supported upon a bearing portion 200 of the shaft 182. It is adapted to mesh with a gear element 202 which forms a part of a cluster gear assembly generally identified by reference character 204. One end of the cluster gear assembly is provided with an extension 206 which is received through a bearing opening 208 formed in the end wall 174 of the transmission housing. A suitable bearing 210 provides the needed support.

The cluster gear assembly includes another extension 212 that is received through bearing opening 214 formed in the wall 150. A suitable bearing 216 is received within the opening 214 to provide another end support for the cluster gear assembly.

The cluster gear assembly includes also a gear element 218 that meshes with a power input gear 172.

A synchronizer clutch hub 220 is splined at 222 to the shaft 182. A synchronizer clutch sleeve 224 is splined to the hub 220 and is adapted for axial movement in either direction although relative rotary movement of the sleeve 224 with respect to the hub 220 is inhibited.

Sleeve 224 is formed with internal splines 232 that engage clutch teeth 226 carried by the gear 198 when the sleeve 224 is shifted in a right-hand direction. The shifting movement of the sleeve 224 is under the control of the vehicle operator through the medium of suitable transmission selector linkage, not shown. This linkage can include a shifter fork having finger portions that are received within a groove 228 formed on the sleeve 224.

If the sleeve 224 is shifted in a left-hand direction, clutching engagement between the sleeve 224 and the clutch teeth 230 is established. These teeth in turn are carried by the gear 172. The gear 172 thus can become locked to the power output shaft 182 upon movement of the sleeve 224 in a left-hand direction. Movement of the sleeve in a right-hand direction, however, establishes a driving connection between gear 198 and the power output shaft 182.

Synchronizer blocker rings 234 are provided on either axial side of the sleeve 224 to establish synchronism between the shaft 182 and the gears 172 and 198, respectively, prior to shifting movement of the sleeve 224. These blocker rings form a portion of the conventional blocker type synchronizer clutch mechanism that is familiar to those skilled in the art and need not be described here with particularity to obtain an understanding of our improvement.

A reverse idler gear is shown in FIGURE 2 at 236. It is rotatably supported by means of a bushing 238 upon a stationary support shaft 240. This shaft is end supported within an opening 242 formed in the wall 178. A corresponding opening can be provided in the wall 150 to provide support for the other end of the shaft 240.

Synchronizer clutch sleeve 224 is formed with reverse drive gear 244 which engages the reverse idler gear 236 when it assumes the intermediate position shown in FIGURE 1. To establish such a driving connection, however, it is necessary to shift the idler gear 236 in a left-hand direction along the shaft 240. This is accomplished by means of a suitable driver operated shift linkage having a shifter fork with ends that may be received within a groove 246 formed in the idler gear 236. If the idler gear 236 is shifted to the position shown in FIGURE 2, however, the gear 244 is incapable of engaging it. It thus is possible to establish a neutral condition by shifting the idler gear 236 to an extreme right-hand position as viewed in FIGURE 2 while the gear 244 assumes the intermediate position shown in FIGURE 1.

Low speed operation can be established by clutching gear 198 to the power output shaft. Direct drive operation, however, is obtained by clutching gear 172 directly to the power output shaft. Thus, the transmission mechanism provides two performance ranges for the power plant system.

The torus cavity of the torque converter unit is in fluid communication with the discharge side of the front engine pump shown at 64 and 66. This communication is established by means of a fluid pressure passage 248 and a passage 250 formed in the crankshaft. A portion of passage 250 is defined by a fluid pressure distributor passageway formed in the crank portion 72 of the crankshaft. This passageway in turn communicates with the converter unit torus circuit through an opening in the impeller shell part 74.

The passage 248 may communicate with a suitable pressure regulator, not shown, that forms a part of the engine lubrication pressure control system. The return flow circuit from the interior of the torus circuit includes radial passages situated on the sides of the converter stator hub which in turn communicate with axial passages defined in part by extension 88. The fluid then passes into the power plant sump located at the lower region of housing 10. The sump is defined in part by an oil pan 252 which may be bolted to the housing 10. The intake side of the front engine pump is in fluid communication with the sump.

It will be apparent from the foregoing that we have provided a compact power plant system which includes a hydrokinetic unit with an impeller shell that is rotatably supported upon the engine housing itself. The bearing support for the impeller shell also forms a bearing support for the engine crankshaft. Indeed, the engine crankshaft is an integral part of the impeller shell so that the latter is capable of providing a flywheel effect as well as an end support for the crankshaft. The over-all dimensions of the power plant system are considerably reduced because of the strategic arrangement of components.

Having thus described the principal features of our invention, what we claim and desire to secure by United States Letters Patent is:

1. A power plant system comprising an internal combustion engine housing, an engine crankshaft, first bearing means for supporting one end of said crankshaft upon said housing for rotation about a principal axis, said crankshaft having a crank portion that is offset radially with respect to said principal axis, a hydrokinetic power transmitting unit comprising an impeller and a turbine disposed in toroidal fluid flow relationship in a torus circuit, said impeller being connected directly to said crank portion of said crankshaft whereby said impeller serves to balance said crankshaft dynamically and to form therewith a common assembly, said turbine being connected to a driven member, and second bearing means for journaling said impeller upon said housing for rotation about said principal axis, said first bearing means and said second bearing means providing the sole means for rotatably supporting the assembly of said impeller and said crankshaft.

2. A power plant system comprising an internal combustion engine housing, an engine crankshaft, first bearing means for supporting one end of said crankshaft upon said housing for rotation about a principal axis, said crankshaft having a crank portion that is offset radially with respect to said principal axis, a hydrokinetic power transmitting unit comprising an impeller and a turbine disposed in toroidal fluid flow relationship in a torus circuit, said impeller being connected directly to said crank portion of said crankshaft whereby said impeller serves to balance said crankshaft dynamically and to form therewith a common assembly, said turbine being connected to a driven member, and second bearing means for journaling said impeller upon said housing for rotation about said principal axis, said first bearing means and said second bearing means providing the sole means for rotatably supporting the assembly of said impeller and said crankshaft, said turbine being disposed on the inboard side of said impeller whereby said hydrokinetic unit is located within said housing to form a unitary power plant.

3. A power plant system comprising an internal combustion engine housing, an engine crankshaft, a first bearing means for supporting one end of said crankshaft upon a first housing portion for rotation about a principal axis, said crankshaft having a crank portion that is offset radially with respect to said principal axis, a hydrokinetic torque converter unit comprising an impeller, a turbine and a stator disposed in fluid flow relationship in a common torus circuit, and second bearing means for supporting said impeller rotatably upon a second portion of said housing for rotation about said principal axis, said first bearing means and said second bearing means providing the sole means for rotatably supporting the assembly of said impeller and said crankshaft, said turbine being connected to a driven member, said impeller being connected directly to said crank portion of said crankshaft to form a unitary power delivering member whereby said impeller serves to balance said crankshaft dynamically, said stator being supported also by said second housing portion.

4. A power plant system comprising an internal combustion engine housing, an engine crankshaft, a first bearing means for supporting one end of said crankshaft upon a first housing portion for rotation about a principal axis, said crankshaft having a crank portion that is offset radially with respect to said principal axis, a hydrokinetic torque converter unit comprising an impeller, a turbine and a stator disposed in fluid flow relationship in a common torus circuit, and second bearing means for supporting said impeller rotatably upon a second portion of said housing for rotation about said principal axis, said first bearing means and said second bearing means providing the sole means for rotatably supporting the assembly of said impeller and said crankshaft, said turbine being connected to a driven member, said impeller being connected directly to the other end of said crankshaft to form a unitary power delivering member whereby said impeller serves to balance said crankshaft dynamically, said stator being supported also by said second housing portion, said turbine being disposed on the inboard side of said impeller whereby said torque converter unit is located entirely within said housing to form a unitary power plant.

5. A power plant system comprising an internal combustion engine housing, an engine crankshaft, first bearing means for supporting one end of said crankshaft upon said housing for rotation about a principal axis, said crankshaft having a crank portion that is offset radially with respect to said principal axis, a hydrokinetic power transmitting unit comprising an impeller and a turbine disposed in toroidal fluid flow relationship in a torus circuit, said impeller being connected directly to said crank portion of said crankshaft whereby said impeller serves to balance said crankshaft dynamically and to form therewith a common assembly, said turbine being connected to a driven member, second bearing means for journaling said impeller upon said housing for rotation about said principal axis, said first bearing means and said second bearing means providing the sole means for rotatably supporting the assembly of said impeller and said crankshaft, said turbine being disposed on the inboard side of said impeller whereby said hydrokinetic unit is located within said housing to form a unitary power plant, an engine lubricating fluid pressure pump drivably connected to said crankshaft, and passage structure formed in part in said crankshaft and communicating with said torus circuit for supplying fluid to the latter.

6. A power plant system comprising an internal combustion engine housing, an engine crankshaft, a first bearing means for supporting one end of said crankshaft upon a first housing portion for rotation about a principal axis, said crankshaft having a crank portion that is offset radially with respect to said principal axis, a hydrokinetic torque converter unit comprising an impeller, a turbine and a stator disposed in fluid flow relationship in a common torus circuit, second bearing means for supporting said impeller rotatably upon a second portion of said housing for rotation about said principal axis, said first bearing means and said second bearing means providing the sole means for rotatably supporting the assembly of said impeller and said crankshaft, said turbine being connected to a driven member, said impeller being connected directly to said crank portion of said crankshaft to form a unitary power delivering member whereby said impeller serves to balance said crankshaft dynamically, said stator being supported also by said second housing portion, an engine lubricating fluid pressure pump drivably connected to said crankshaft, and passage structure formed in part in said crankshaft and communicating with said torus circuit for supplying fluid to the latter.

References Cited by the Examiner
UNITED STATES PATENTS

| 1,766,520 | 6/30 | Klimek | 60—54 |
| 2,800,037 | 7/57 | Czuba et al. | 60–12 X |

FOREIGN PATENTS 599,543   10/25   France.

JULIUS E. WEST, *Primary Examiner.*